(12) United States Patent  
Hurwitz

(10) Patent No.: US 11,860,114 B2  
(45) Date of Patent: Jan. 2, 2024

(54) DETERMINING ATOMIC COORDINATES FROM X-RAY DIFFRACTION DATA

(71) Applicant: David Hurwitz, Rockville, MD (US)

(72) Inventor: David Hurwitz, Rockville, MD (US)

( * ) Notice: Subject to any disclaimer, the term of this patent is extended or adjusted under 35 U.S.C. 154(b) by 952 days.

(21) Appl. No.: 16/830,532

(22) Filed: Mar. 26, 2020

(65) Prior Publication Data

US 2021/0302332 A1    Sep. 30, 2021

(51) Int. Cl.
- *G01N 23/20* (2018.01)
- *G06N 3/02* (2006.01)
- *G06N 3/084* (2023.01)
- *G06N 3/04* (2023.01)

(52) U.S. Cl.
CPC ............... *G01N 23/20* (2013.01); *G06N 3/02* (2013.01); *G06N 3/04* (2013.01); *G06N 3/084* (2013.01); *G01N 2223/0566* (2013.01); *G01N 2223/345* (2013.01)

(58) Field of Classification Search
None
See application file for complete search history.

(56) References Cited

U.S. PATENT DOCUMENTS

| | | | |
|---|---|---|---|
| 2018/0245235 A1* | 8/2018 | Chung | H01L 21/02628 |
| 2021/0332140 A1* | 10/2021 | Percier | A61P 11/00 |
| 2021/0381992 A1* | 12/2021 | Aguiar | G01N 23/20058 |

* cited by examiner

*Primary Examiner* — Dov Popovici  
(74) *Attorney, Agent, or Firm* — Panitch Schwarze Belisario & Nadel LLP

(57) ABSTRACT

Atomic position data may be obtained from x-ray diffraction data. The x-ray diffraction data for a sample may be squared and/or otherwise operated on to obtain input data for a neural network. The input data may be input to a trained convolutional neural network. The convolutional neural network may have been trained based on pairs of known atomic structures and corresponding neural network inputs. For the neural network input corresponding to the sample and input to the trained convolutional neural network, the convolutional neural network may obtain an atomic structure corresponding to the sample.

19 Claims, 22 Drawing Sheets

```
input  = Input(shape=data.InData.shape)                                                                             (input)
L01a   = Conv3D(20, 5, activation='relu', padding='same', kernel_initializer='he_normal')                           (L01a)
L01b   = Conv3D(20, 5, activation='relu', padding='same', kernel_initializer='he_normal')                           (L01b)
D02    = MaxPooling3D(pool_size=(2,2,2))                                                                            (D02)
L08a   = Conv3D(20, 7, activation='relu', padding='same', kernel_initializer='he_normal')                           (L08a)
L08b   = Conv3D(20, 7, activation='relu', padding='same', kernel_initializer='he_normal')                           (L08b)
L08c   = Conv3D(20, 7, activation='relu', padding='same', kernel_initializer='he_normal')                           (L08c)
L08d   = Conv3D(20, 7, activation='relu', padding='same', kernel_initializer='he_normal')                           (L08d)
L08e   = Conv3D(20, 7, activation='relu', padding='same', kernel_initializer='he_normal')                           (L08e)
L08f   = Conv3D(20, 7, activation='relu', padding='same', kernel_initializer='he_normal')                           (L08f)
L08g   = Conv3D(20, 7, activation='relu', padding='same', kernel_initializer='he_normal')                           (L08g)
L08h   = Conv3D(20, 7, activation='relu', padding='same', kernel_initializer='he_normal')                           (L08h)
U03    = UpSampling3D(size=(2,2,2))                                                                                 (U03)
L15a   = Conv3D(20, 5, activation='relu', padding='same', kernel_initializer='he_normal')                           (L15a)
output = Conv3D( 1, 5, activation='tanh', padding='same', kernel_initializer='he_normal')
model  = Model(inputs=[input], outputs=[output])
print(model.summary(line_length=150))
model.compile(optimizer=Adam(lr=LR), loss=customLoss)
```

Based on Keras Platform, and based on information found at Home – Keras Documentation. Available at https://keras.io/.

FIG. 5

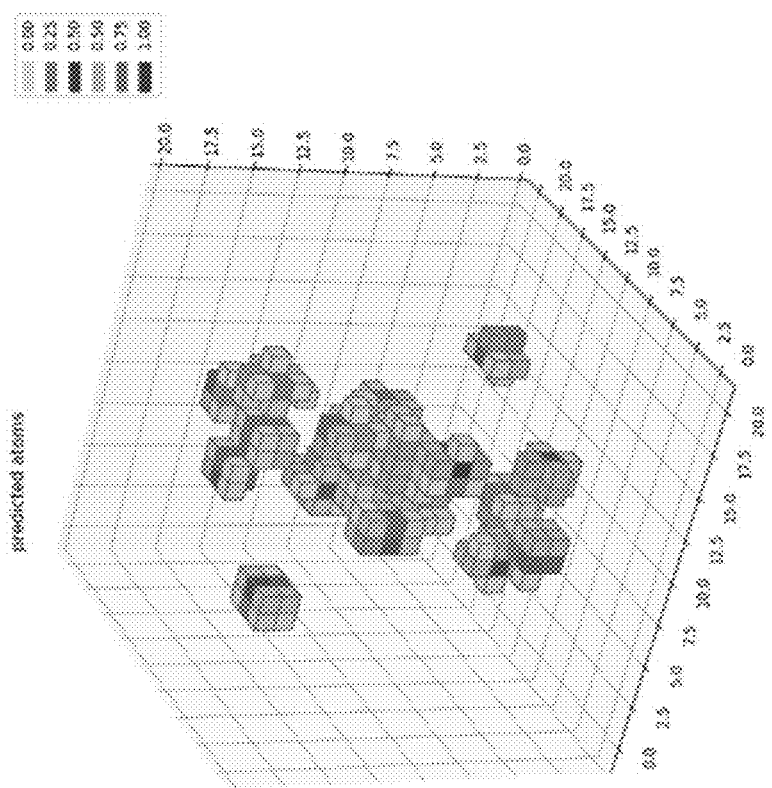
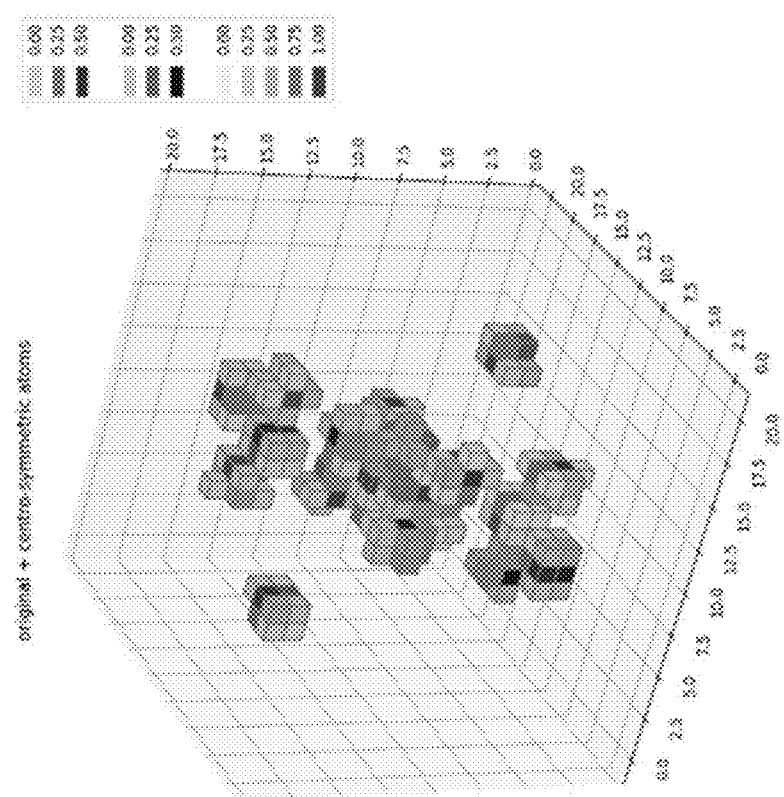
FIG. 14A

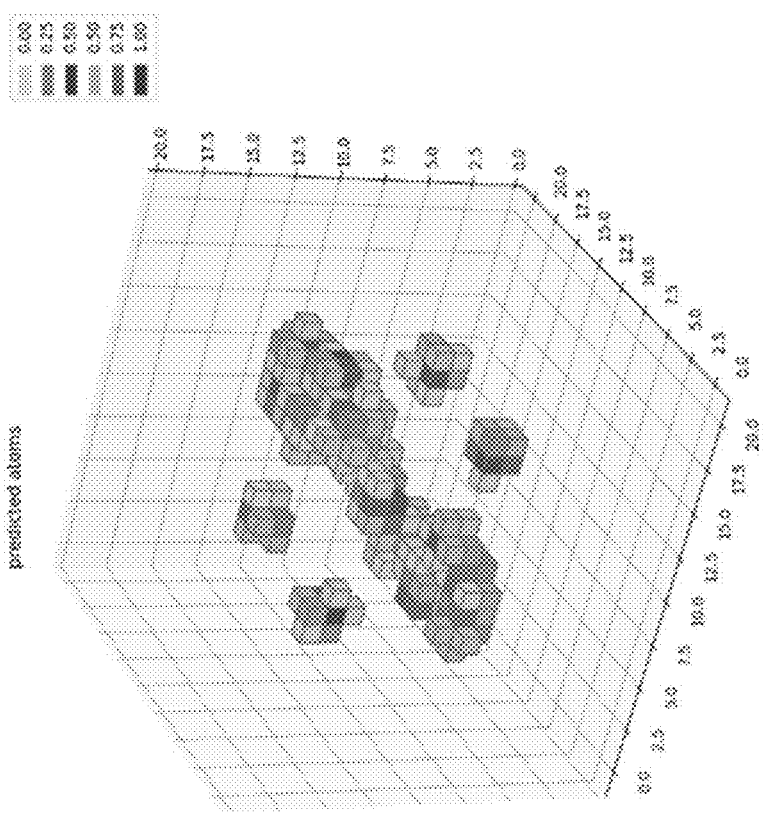
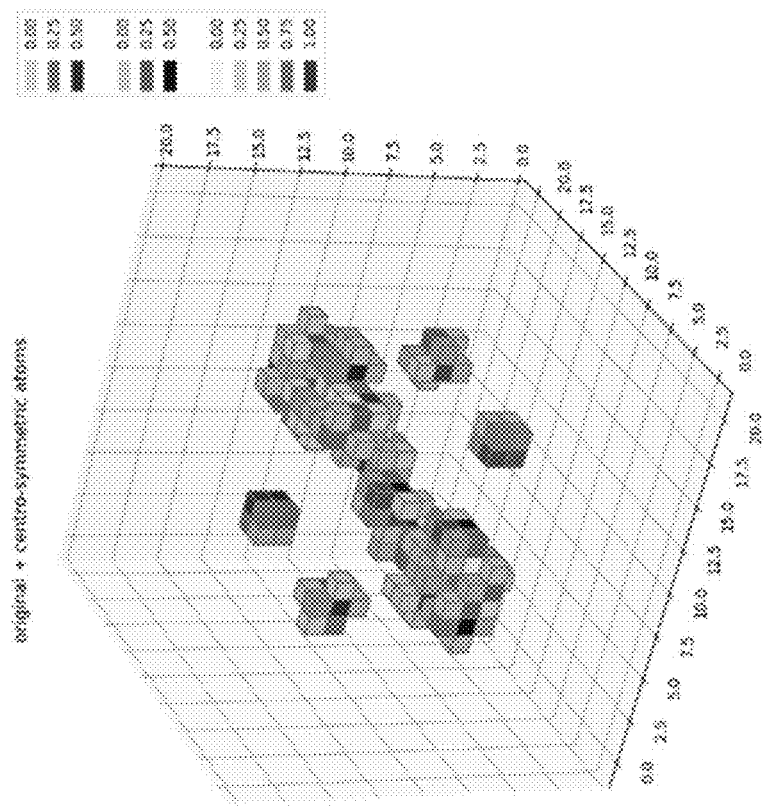
FIG. 14B

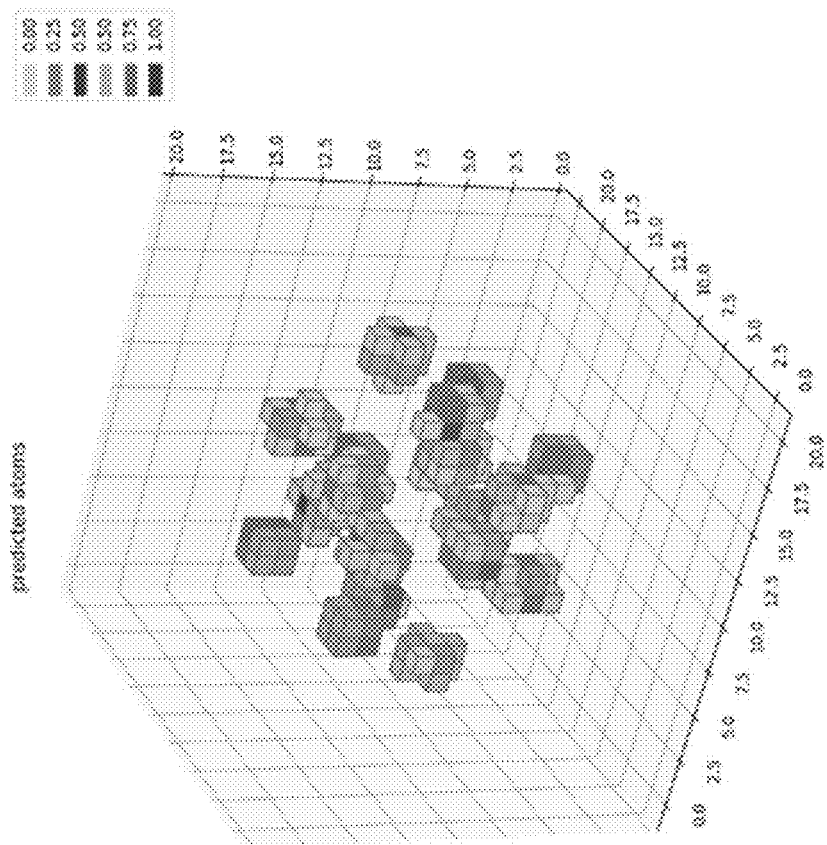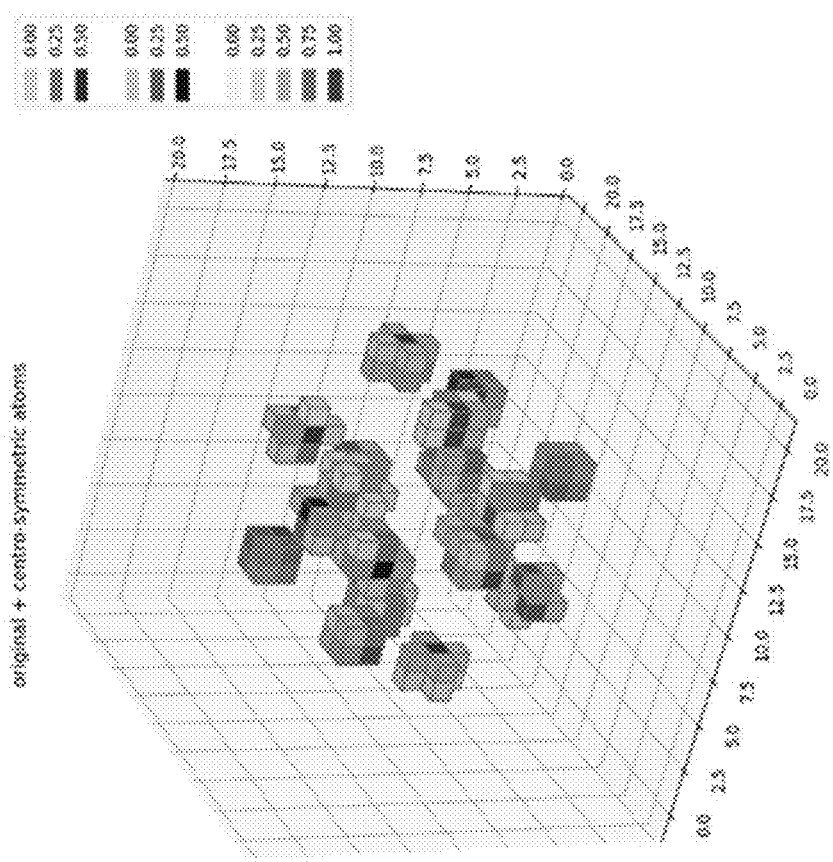
FIG. 14C

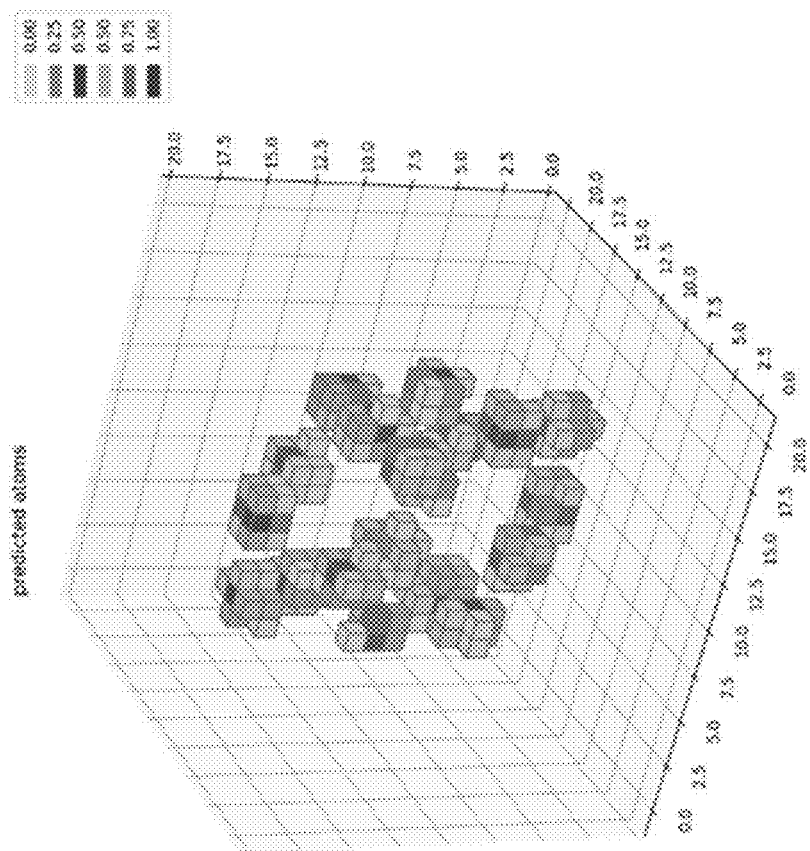
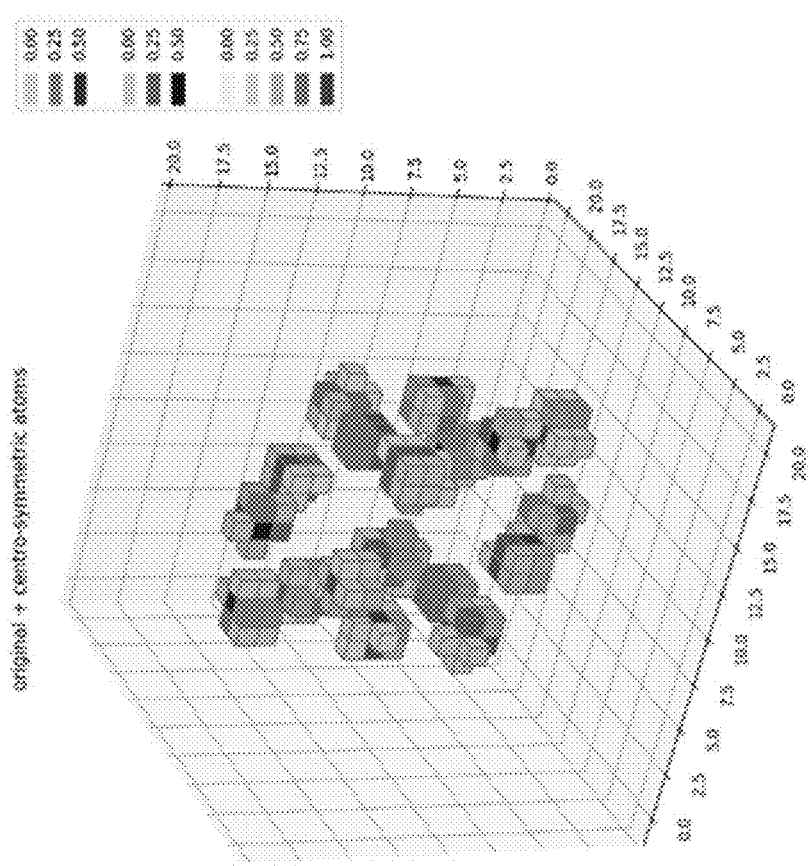
FIG. 14D

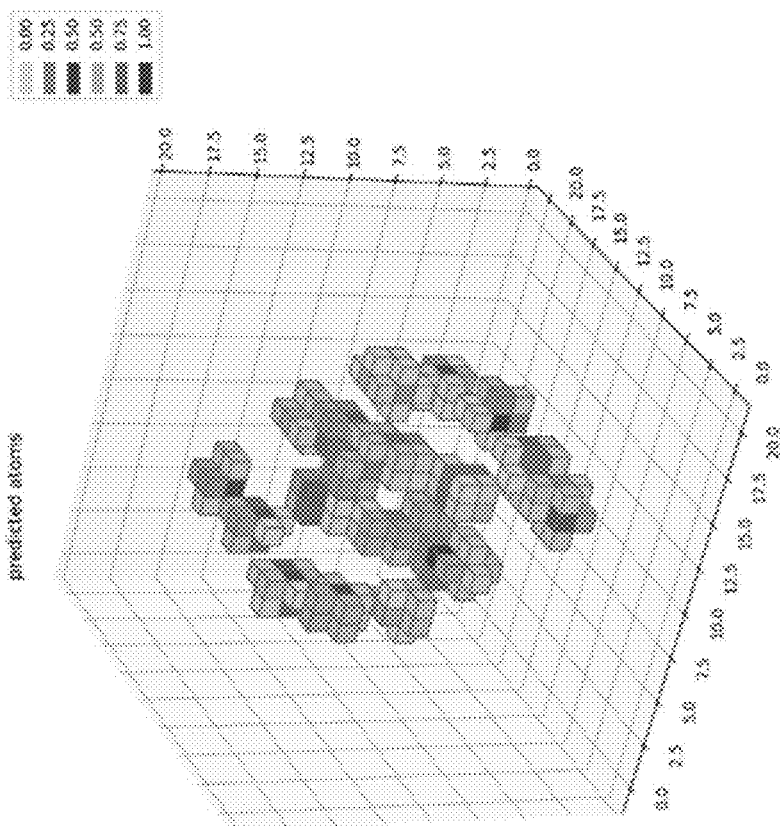
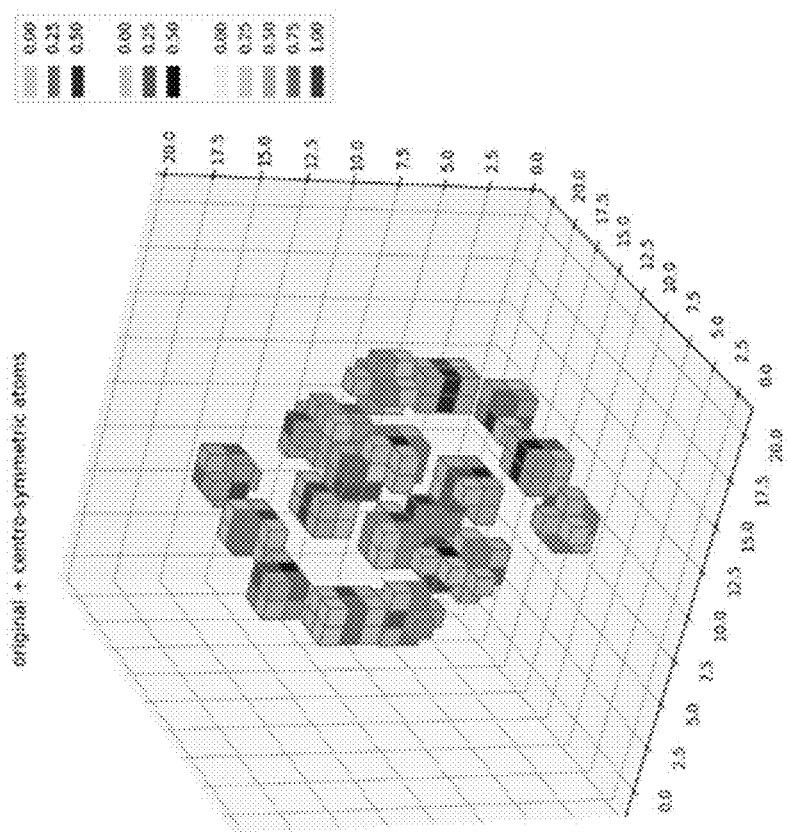
FIG. 14E

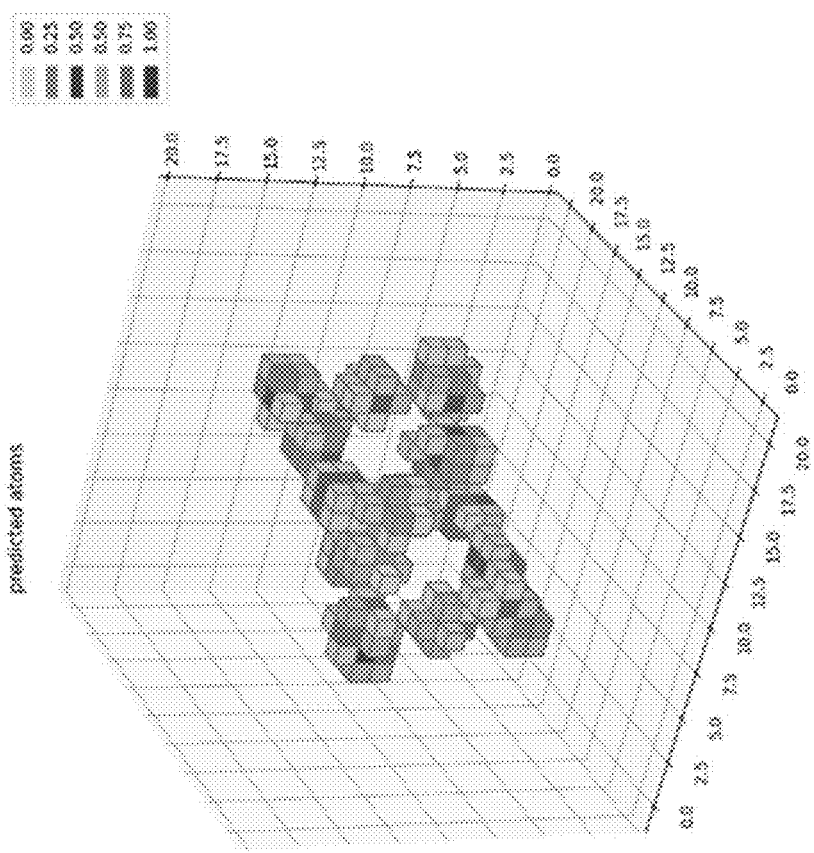
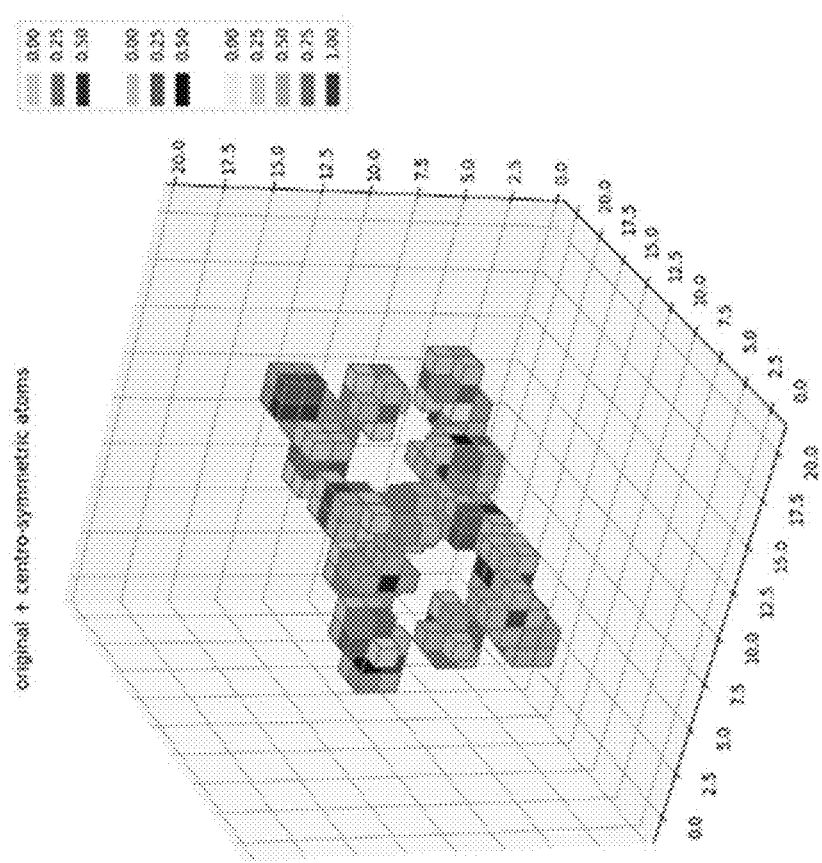
FIG. 14F

DETERMINING ATOMIC COORDINATES FROM X-RAY DIFFRACTION DATA

FIELD

Various aspects of the present disclosure may relate to systems and/or processes for deriving atomic structure, in the form of atomic coordinates, from data obtained using x-ray crystallography, by training and using neural networks.

BACKGROUND

X-ray crystallography has been an essential tool in protein and nucleic acid structure determination since the 1950s. Of the 158,367 structures in the Protein Data Bank in December 2019, 89% were solved using X-ray crystallography.

A crystal in the path of an X-ray beam produces an X-ray diffraction pattern. The diffraction pattern is the Fourier transform of the electron density in the crystal's repeating unit. However, the data that can be collected is incomplete. The magnitude of each spot can be measured, but the phases cannot be recovered. The loss of phase information during an X-ray crystallographic experiment is known as "the phase problem".

Were the phases recoverable, it would be a simple matter to reconstruct the molecular structure of the crystal's repeating unit by computing the inverse Fourier transform of the diffraction data. Absent phases, other strategies, such as molecular replacement and multiple isomorphous replacement, are used to determine macromolecular structure from diffraction magnitudes.

In some cases, it is possible to compute molecular structure directly from X-ray data. This is referred to as "direct methods" in X-ray crystallography. Direct methods make use of the fact that, when electron density maps are composed of atoms, and density is always positive, the diffracted phases are not random. Rather, phases of certain reflection triplets have a high probability of summing to zero. Solving a system of such probability equations can determine the unknown phases. In practice, this has only been possible for molecules of up to a few hundred atoms that diffract to high resolution.

It would be desirable to have a way to solve the phase problem, and compute molecular structure, in such a way that may scale up to larger molecules than the direct methods and/or which may be useful for lower resolution.

SUMMARY OF VARIOUS ASPECTS OF THE DISCLOSURE

Various aspects of the present disclosure may relate to ways in which the above issues may be addressed. In particular, one or more neural networks may be trained, based on known Patterson maps/known atomic structures, to be able to address unknown Patterson maps to obtain atomic structures (e.g., of molecules).

Implementations may be in the form of hardware, software, firmware, or combinations thereof, including executable instructions stored on a non-transitory computer-readable medium, e.g., a memory device, that may be executed on one or more processing devices. Various components may be implemented in one or more chips, chipsets, circuit boards, etc., or in the form of one or more programmed processors.

BRIEF DESCRIPTION OF THE DRAWINGS

Various aspects of the disclosure will now be described in conjunction with the accompanying drawings, in which:

FIGS. 5 and 6 show an example of a convolutional neural network, according to aspects of the present disclosure, and which was used to implement a demonstration of techniques according to aspects of the present disclosure;

FIGS. 14A-14F show corresponding plots demonstrating performance of a trained convolutional neural network according to various aspects of the present disclosure;

DETAILED DESCRIPTION OF VARIOUS ASPECTS OF THE DISCLOSURE

One tool that may be useful to help interpret a diffraction pattern is the Patterson map. The Patterson map is the inverse Fourier transform of the square of the magnitudes of the diffraction data. Whereas a Fourier transform of magnitudes and phases gives molecular structure, the Fourier transform of the square of the magnitudes gives a map of vectors between each pair of atoms in the structure. This may be a more intuitive starting point than diffraction data.

To say that the Patterson map is the inverse Fourier transform of the diffraction magnitudes squared is equivalent to saying that the Patterson map is the original electron density map convolved with its inverse. This is a restatement of the Convolution Theorem: multiplication in Fourier space is equivalent to convolution in real space. In mathematical terms, if the electron density may be expressed in the form:

$$\rho_{xyz} = \sum_b \sum_k \sum_\ell \vec{F}_{bk\ell} e^{-i2\pi(bx+ky+\ell z)}$$

(see, e.g., kinemage.biochem.duke.edu/teaching/BCH681/2013BCH681/elasticScattering/400.ElasticPattersonFunction.html), then the Patterson function (which generates the Patterson map, when considered over the space of the crystal), may be expressed in the form:

$$P_{xyz} = \sum_b \sum_k \sum_\ell |F_{bk\ell}|^2 e^{-i2\pi(bx+ky+\ell z)}$$

That is, squaring the diffraction magnitudes in Fourier space, then doing an inverse Fourier transform on the product, is equivalent to doing a convolution of the electron density map with itself, i.e., $P_{(x,y,z)} = \rho(x,y,z) \otimes \rho_{(-x,-y,-z)}$. $P_{(x,y,z)}$ may be referred to as the "Patterson map function." It is noted that the above represents a discrete inverse Fourier transform, which may be implemented in the form of an inverse Fast Fourier Transform (IFFT); this may apply to later references to inverse Fourier transformation in this disclosure. Similarly, when Fourier transformation is discussed in this disclosure, it may be implemented in the form of a Fast Fourier Transform (FFT).

So, the problem of going from a Patterson map to atomic coordinates may be thought of as a deconvolution. In this light, it may be seen that the problem of going from Patterson maps to atomic coordinates is, in some ways, comparable to other deconvolution problems that have already been examined with neural networks, such as image sharpening, and image "super-resolution."

Neural networks are a shift from traditional rules-based programming. They learn to solve a problem by example, as opposed to solving a problem by following a comprehensive set of logical operations. A neural network is trained to do a task by showing the network, typically, many thousands of training examples, then seeing if the network can generalize for cases not in the training set.

Figure 1:
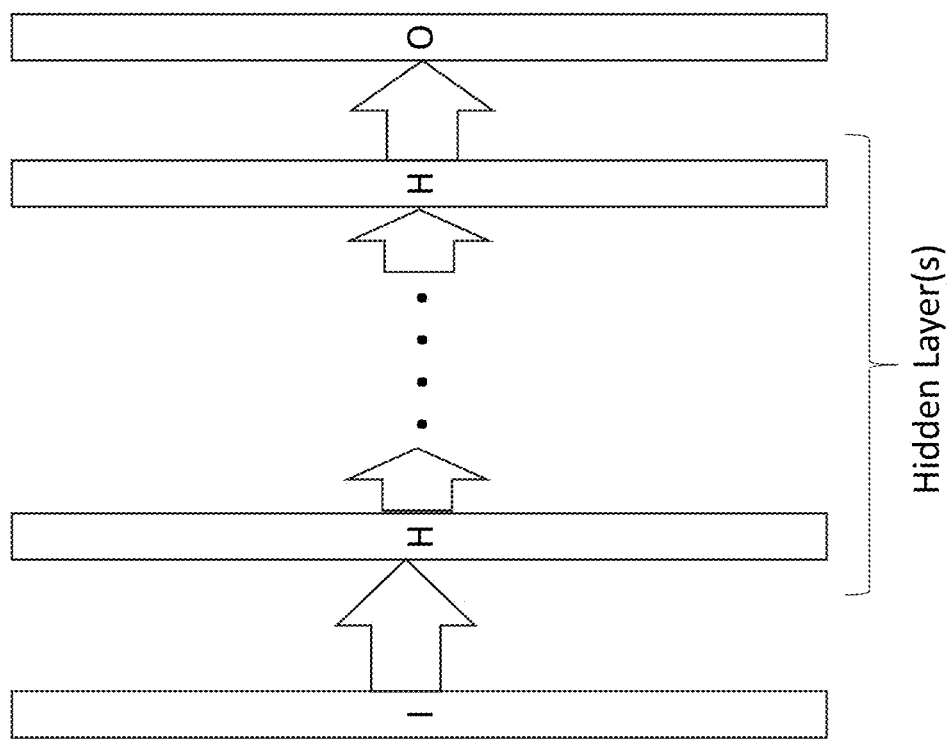
FIG. 1 shows a conceptual block diagram of a neural network according to various aspects of the present disclosure.

A neural network may typically be composed of highly interconnected nodes, arranged in layers, with weights that multiply the connection strengths between nodes. FIG. 1 shows a conceptual example of a neural network. A neural network may include an input layer I and an output layer O, with one or more so-called "hidden layers" H disposed between the input layer I and the output layer O. Each of the layers I, O, H comprises nodes. The (weighted) connections may be summed in the nodes, and a non-linearity may be applied to each node's output. During training, the weights may be adjusted so that computed neural network outputs match known outputs from the training set. An important advancement in modern neural network methods was the development of learning by back-propagation of errors, for training the networks.

Figure 2:
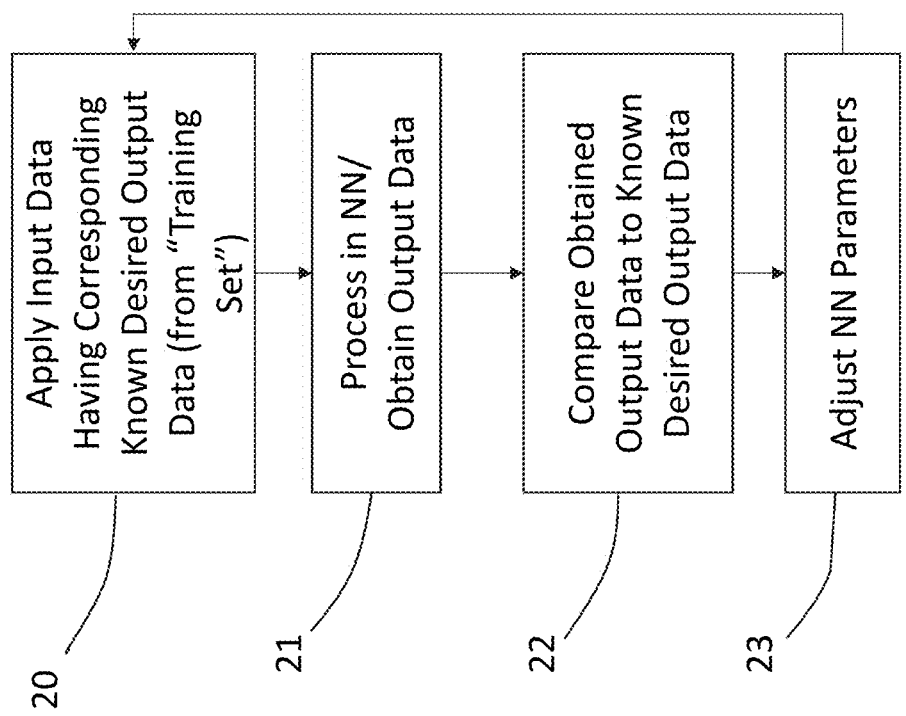
FIG. 2 shows a conceptual flow diagram of a process of training a neural network, according to various aspects of the present disclosure.

FIG. 2 shows a conceptual example of training by back-propagation, according to aspects of the present disclosure. Input data from a known input/output data pair of a training set may be applied 20 as input to the neural network. The input data may then be processed 21 by the neural network to obtain output data. The output data may then be compared 22 to the known output of known input/output pair, which may measure the error between the output data and the known output data. The error may then be back-propagated through the neural network to adjust weights and biases within the neural network 23; this is how the neural network 23 "learns," and there are many known algorithms for implementing this process. The process may be repeated until a predetermined acceptable error is achieved (e.g., but not limited to, a percent error or mean-square error from the positions of the atoms in the known output data, which may, e.g., be based on summations of differences from the positions of the atoms in the known output data, but which is not thus limited (another alternative would be to work directly from the values of the "true" electron density map and the electron density map output from neural network 23, which provides the position information)).

When neural network layers are "fully connected," the number of weights and biases in the network can be prohibitively large. In a fully connected layer, each node in the layer is connected to each node in the previous layer. For networks where the input to the network is, say, a high-quality image, and that rough image size is propagated through the network, the number of weights in a fully connected layer is the square of the image size, which may be unworkable.

For this reason, the development of convolutional neural networks was critically important to developing effective neural networks for imaging applications. In convolutional neural networks, convolution operations are performed on small portions of a layer's nodes at a time. Convolution "kernels" are typically, but are not limited to, 3-7 pixels per dimension; note that in the present case of three-dimensional molecular structures, this may correspond to three-dimensional convolution kernels of size 27-343 voxels (but again, this is an example range, not intended to be limiting). Many kernels can be used at each layer, but still, the number of weights in the network can be quite small because the number of weights is proportional to the size of the kernel, not the square of the number of pixels in an image. The kernels may be applied across an entire image, one patch at a time (and similarly, across blocks of voxels of a three-dimensional image; various three-dimensional convolution methods are known, and for explanations of three-dimensional convolution, see, e.g., towardsdatascience.com/a-comprehensive-introduction-to-different-types-of-convolutions-in-deep-learning-669281e58215 or www.kaggle.com/shivamb/3d-convolutions-understanding-use-case)). As a result, the kernel weights may be effectively shared across the image. Convolutional neural networks have enabled neural networks to be built with a relatively small number of weights at each layer of the neural network, and a large number of layers. This type of network architecture was another important advancement in the deep-learning revolution.

Convolutional neural networks may include input and output layers, along with one or more "hidden layers," similar to multi-layer perceptrons (see FIG. 1). However, the one or more hidden layers of a convolutional neural network may include at least one convolution layer, as described in the preceding paragraph, and may also include other types of layers, known in the art, such as pooling layers, rectified linear unit (ReLU) layers, fully-connected layers and/or loss layers.

Each layer of the neural network may have multiple output volumes/images, which may be denoted as "channels." These channels may correspond to the operation of different convolution kernels on the previous layer's outputs. Convolution kernels may be directed to different aspects of the volume/image. As such, the results obtained from applying such kernels may be combined, e.g., at the output layer of the convolutional neural network, to obtain a final volume/image.

According to aspects of the present disclosure, the phase problem may be presented to a convolutional neural network as three-dimensional images, with Patterson maps on the input, and simulated electron density maps on the output, which may thus take advantage of the advances in image processing based on convolutional neural networks. That is, one or more convolutional neural networks may be used to, in essence, perform a deconvolution of the Patterson map to obtain atomic structure.

In order to do this, the convolutional neural network may be trained on a known training set. For training the convolutional neural network, given the above-described description of Patterson maps, one may take known atomic structures, e.g., in the form of density maps, and may "work backwards" to obtain their corresponding Patterson maps, by convolving them with their inverses, i.e., by using the Patterson map function. The resulting Patterson map/electron density map pairs may form a training set for a convolutional neural network.

Figure 3:
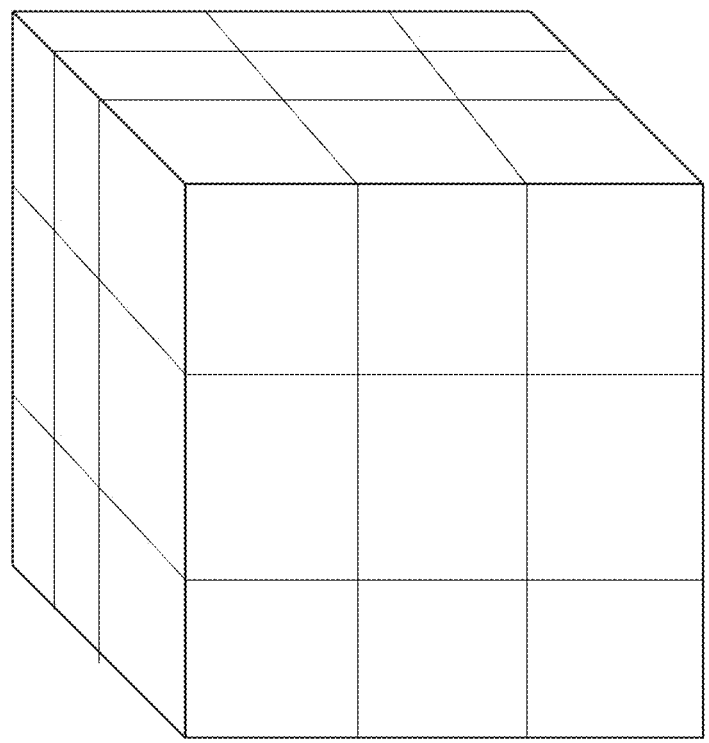
FIGS. 3 and 4 show conceptual representations of portions of atomic structure data that may be associated with various aspects of the present disclosure.
Figure 4:
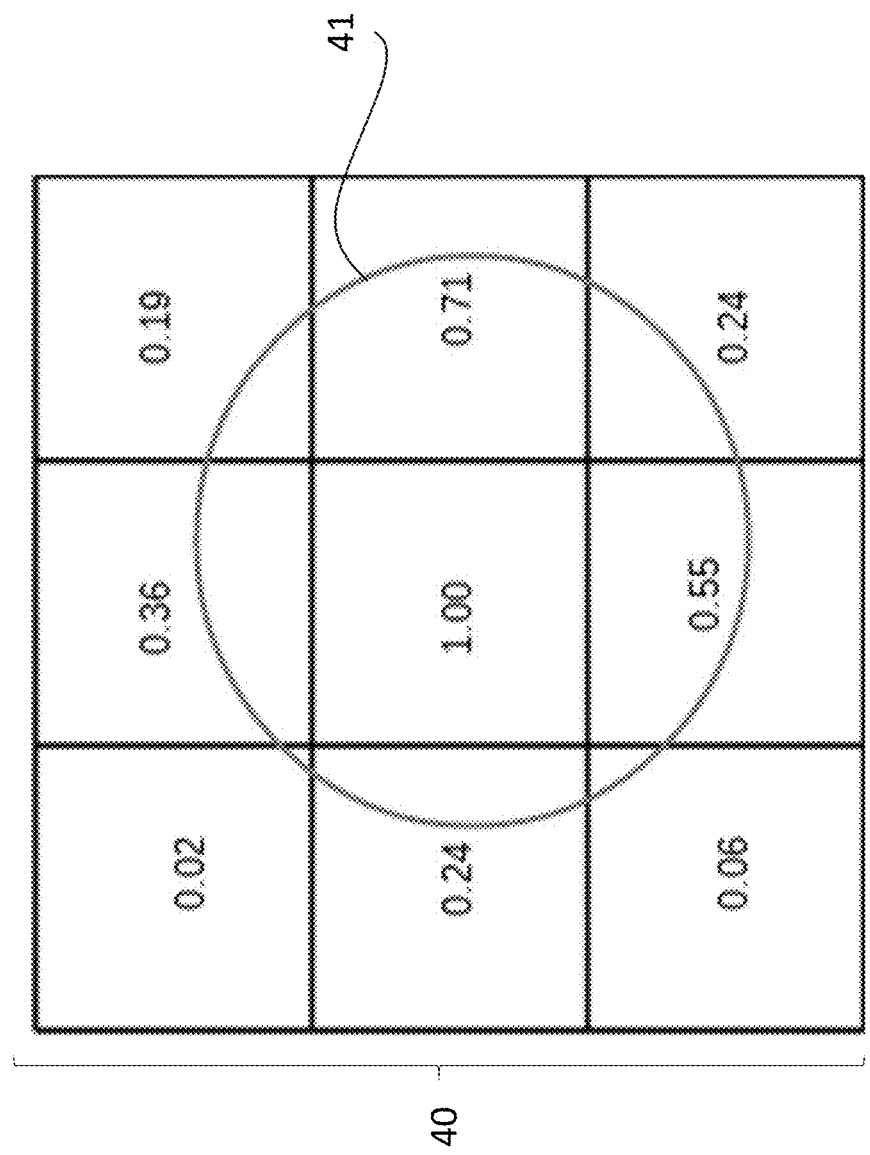

FIGS. 3 and 4 provide representations of how atomic structure data, known or output by a convolutional neural network, according to various aspects of the present disclosure. Because a molecule or other structure composed of atoms may generally be three-dimensional, the output data/known data may thus be represented in three dimensions. In one example, shown in FIG. 3, a 3×3×3 cube 30 is shown. In one example, the output layer of the convolutional neural network may represent an entire n×n×n three-dimensional space in units of 3×3×3 blocks, and the atoms may fall entirely or partially within one or more of the 3×3×3 blocks. It is noted that the three-dimensional space may not necessarily be n×n×n, but may alternatively be of different numbers of voxels in different dimensions. In one non-limiting example, the atoms of the training data atomic structures may lie entirely within a single cube; but this is not necessary.

As shown in FIG. 3, a 3×3×3 cube may be viewed, in each of the three dimensions, as having three layers of voxels. FIG. 4 shows a two-dimensional non-limiting representation of one such layer 40. An atom 41, which may, as noted above, be reflected by an electron density, may be placed (in training data) or may be output (in an output of the convolutional neural network) completely within cube 30 and layer 40. Given that an atom is three-dimensional, in the conceptual example of FIG. 4, the atom may be represented by a sphere 41, which may correspond to a circle 41 in two dimensions, e.g., in a particular layer 40 of cube 30. The numbers in FIG. 4 may represent a fraction of a given voxel that is occupied by sphere 41.

Figure 6:
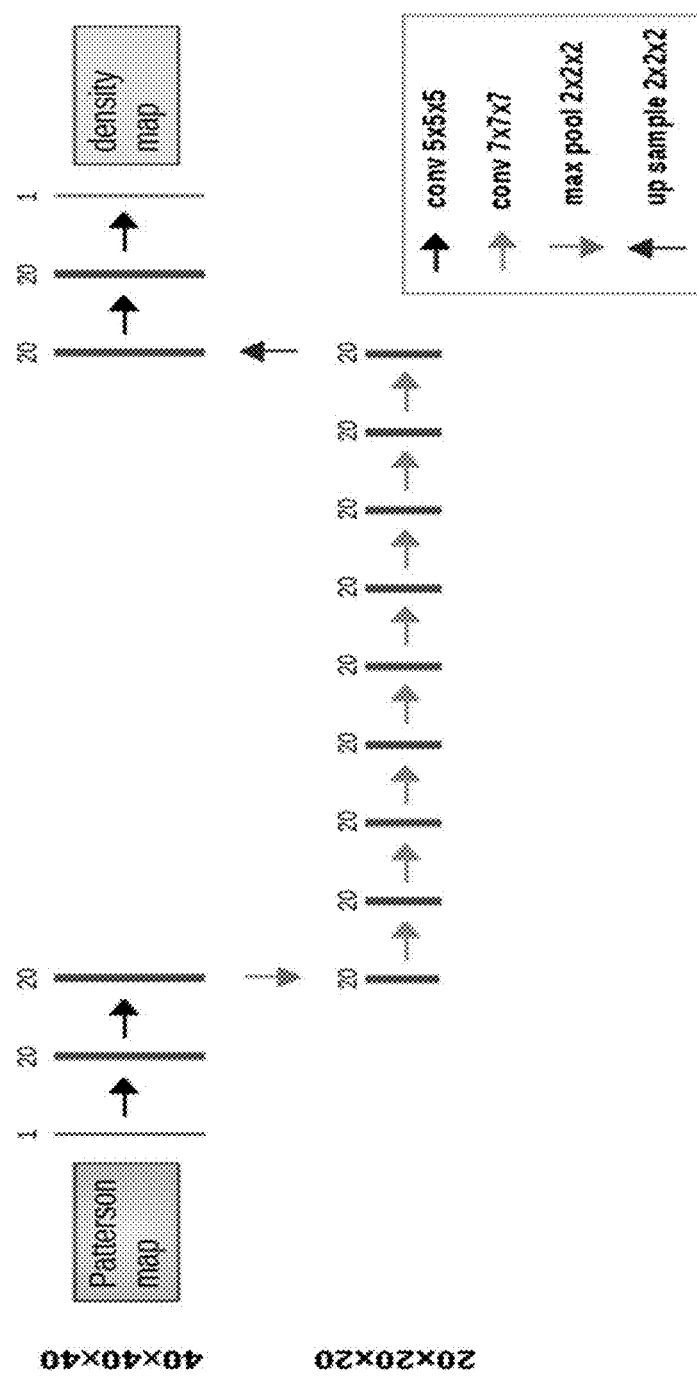

FIG. 5 shows code based on the Keras Platform (available at keras.io) and used in a demonstration of a non-limiting convolutional neural network according to aspects of the present disclosure. FIG. 6 shows a schematic representation of this non-limiting example of a convolutional neural network. The example convolutional neural network of FIGS. 5 and 6 uses twelve three-dimensional convolution layers (represented by horizontal arrows in FIG. 6), using kernels of 5×5×5 voxels or 7×7×7 pixels. Again, this is intended as a non-limiting example. In this example, each layer other than the output layer has a set of twenty output channels. The input volume size used in a demonstration using this neural network example was 40×40×40 voxels. A max-pooling layer (represented by the downward arrow in FIG. 6) was used in this example to shrink this down by a factor of eight, to 20×20×20 voxels, and an up-sampling layer (represented by the upward arrow in FIG. 6) was used in this example to expand the dimensions back to 40×40×40 voxels. In this example, the first and last layers used 2,500 weights; two layers used 50,000 weights; and eight layers used 137,200 weights. The result, including 221 bias terms (corresponding to the kernels), was 1,202,821 weights.

Again, this is a non-limiting example, and the sizes of the datasets, the numbers and types of layers, etc., may vary in other examples.

Returning now to FIG. 2, training of the convolutional neural network may require judicious choice of the training set so that the network will be properly trained and will be able to generalize to Patterson maps not included in the training set. In particular, it may generally be necessary to ensure that the network is not trained based on conflicting data. Namely, a given Patterson map of the training set cannot correspond to two or more different atomic output structures.

One property of a Patterson map is that it is translation-invariant, i.e., a set of atomic coordinates has the same Patterson map regardless of its position in space. This may give rise to the potential for having a training set with multiple training cases having the same Patterson map but different translations of the atoms for different output cases. To address this, translational freedom may be removed by translating the set of atoms used as desired outputs so that the average atom position is at a center point of the output map (e.g., by summing the respective positional coordinates and dividing each by the number of atoms).

Figures 7A, 7B, 7C:
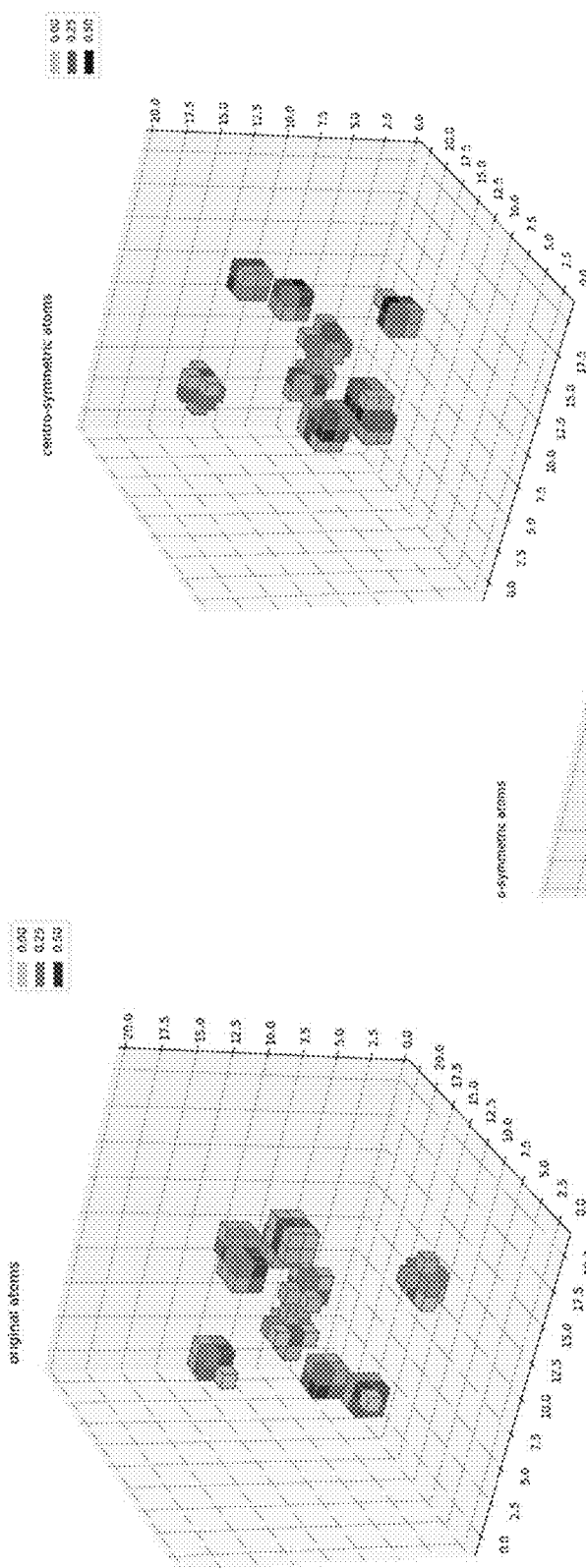
FIGS. 7A-7C show an example of training data having centrosymmetry.

A second property of a Patterson map is that it is invariant with respect to centrosymmetric inversion. This means that a set of atoms treated as a desired output may give rise to the same Patterson map as its centrosymmetry-related atoms. To address this ambiguity, the network may be trained using both sets of atoms simultaneously. FIGS. 7A-7C show a non-limiting example of such a case. FIG. 7A shows a collection of ten, non-overlapping atoms. FIG. 7B shows a centrosymmetric inversion of the ten, non-overlapping atoms of FIG. 7A. Then, a Patterson map corresponding to FIG. 7C, which combines the examples of FIGS. 7A and 7B, may be used to train the convolutional neural network. That is, one may train the convolutional neural network to output a combined set of atoms that correspond to two centrosymmetrically-related sets of atoms for a given Patterson map.

Note that, in contrast with FIG. 4, when dealing with simultaneous sets of centrosymmetrically-related atoms, the densities may be scaled for each set, such that the maximum density per set is 0.5, instead of 1.0 (as in FIG. 4), and therefore, the maximum density in any one voxel is still limited to 1.0. Further note that, even though the two sets of centrosymmetrically-related atoms may be "tangled" with each other, according to various techniques presented later in this disclosure, it may be possible to untangle the two sets of atoms and separate them.

Figure 8A:
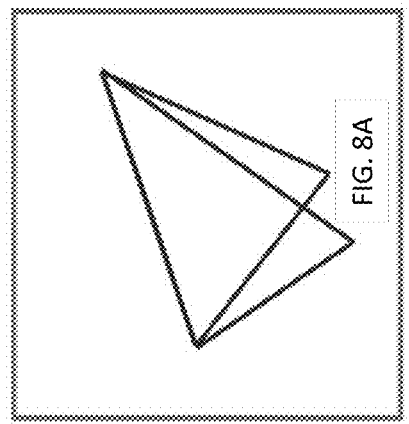
FIGS. 8A-8F show an example of training data having vector origin ambiguity.
Figure 8B:
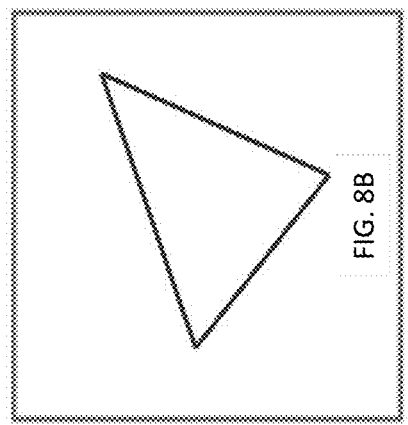
Figure 8C:
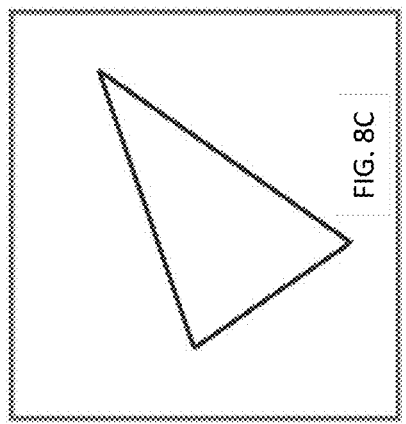
Figure 8D:
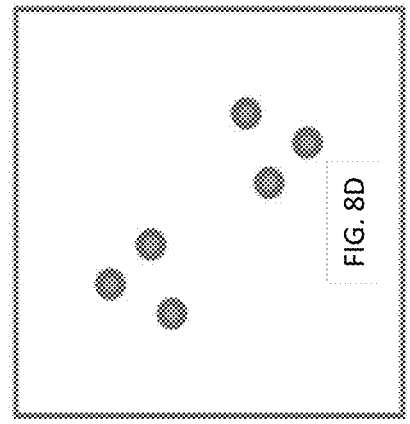
Figure 8E:
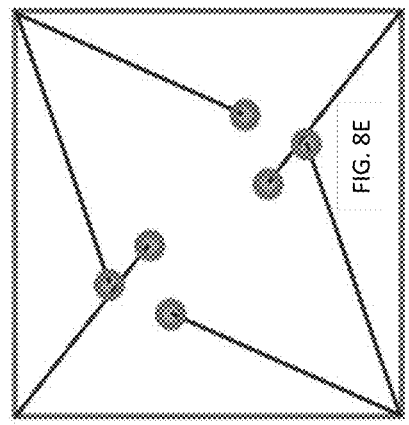
Figure 8F:
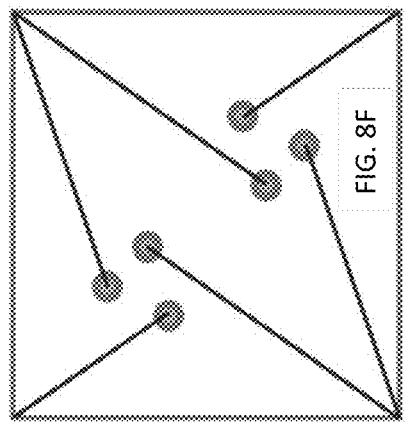
Figure 9C:
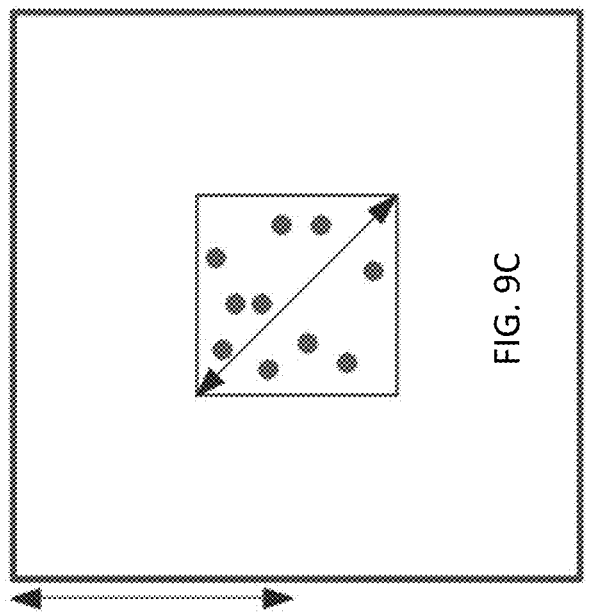
FIGS. 9A-9C show an example of how vector origin ambiguity may be addressed, according various aspects of the present disclosure.
Figure 9B:
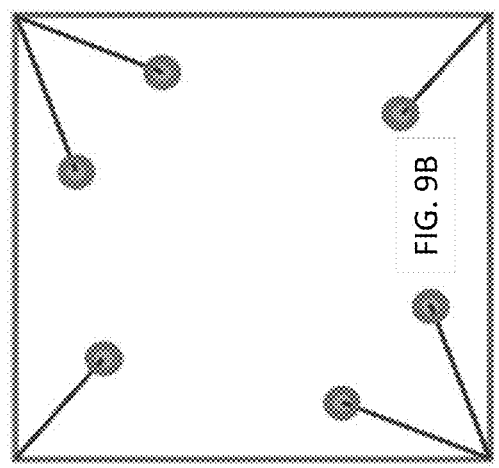
Figure 9A:
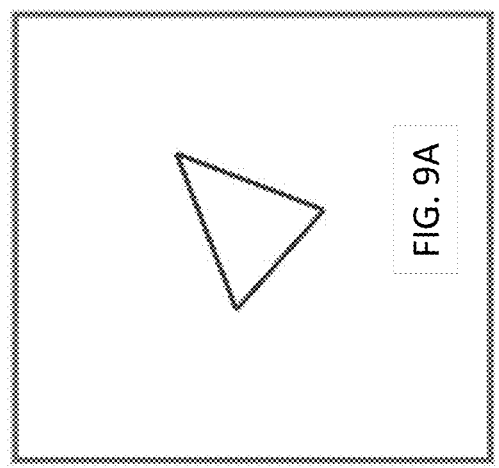

A third issue in the use of Patterson maps as training data is that the atomic coordinates may not be unique, e.g., regarding vector origins in space. This may be demonstrated by the example of FIGS. 8A-8F. The two sets of three atoms shown in FIGS. 8B and 8C have different spatial arrangements, as shown when they are superimposed in FIG. 8A. However, if vectors between the atoms are drawn, as shown in the examples of FIGS. 8E and 8F, the endpoints may be identical, as demonstrated by the example of FIG. 8D. Hence, a given Patterson map may be produced by such different arrangements of atoms. To address this, distances between atoms may be restricted to less than half an edge length of the "output box" of the convolutional neural network. Here, "output box" refers to a three-dimensional structural constraint within which the output atomic structures may be scaled, and which may be predetermined. The restriction of the distances between atoms to less than half an edge length of the output box may be accomplished by adding sufficient empty space around the atoms. This may be done by conceiving of the arrangement of atoms as being contained within a hypothetical inner box contained within the output box. If the size of the inner box is sufficiently small, then the distance between any pair of atoms in the inner box may be less than half the length of an edge distance of the output box, as shown in FIG. 9C. As a result, a given peak of the Patterson map data may result in a vector that originates at the vertex of the output box to which it is closest. An illustrative example of this is shown in FIGS. 9A-9B. This may serve to eliminate all but one possible vector origin for each Patterson map data peak (corresponding to an atomic position).

With the use of the preceding three techniques together, the maximum possible atomic arrangements for a given Patterson map may be limited to two, and those two may be centrosymmetrically-related arrangements.

Figure 10A:
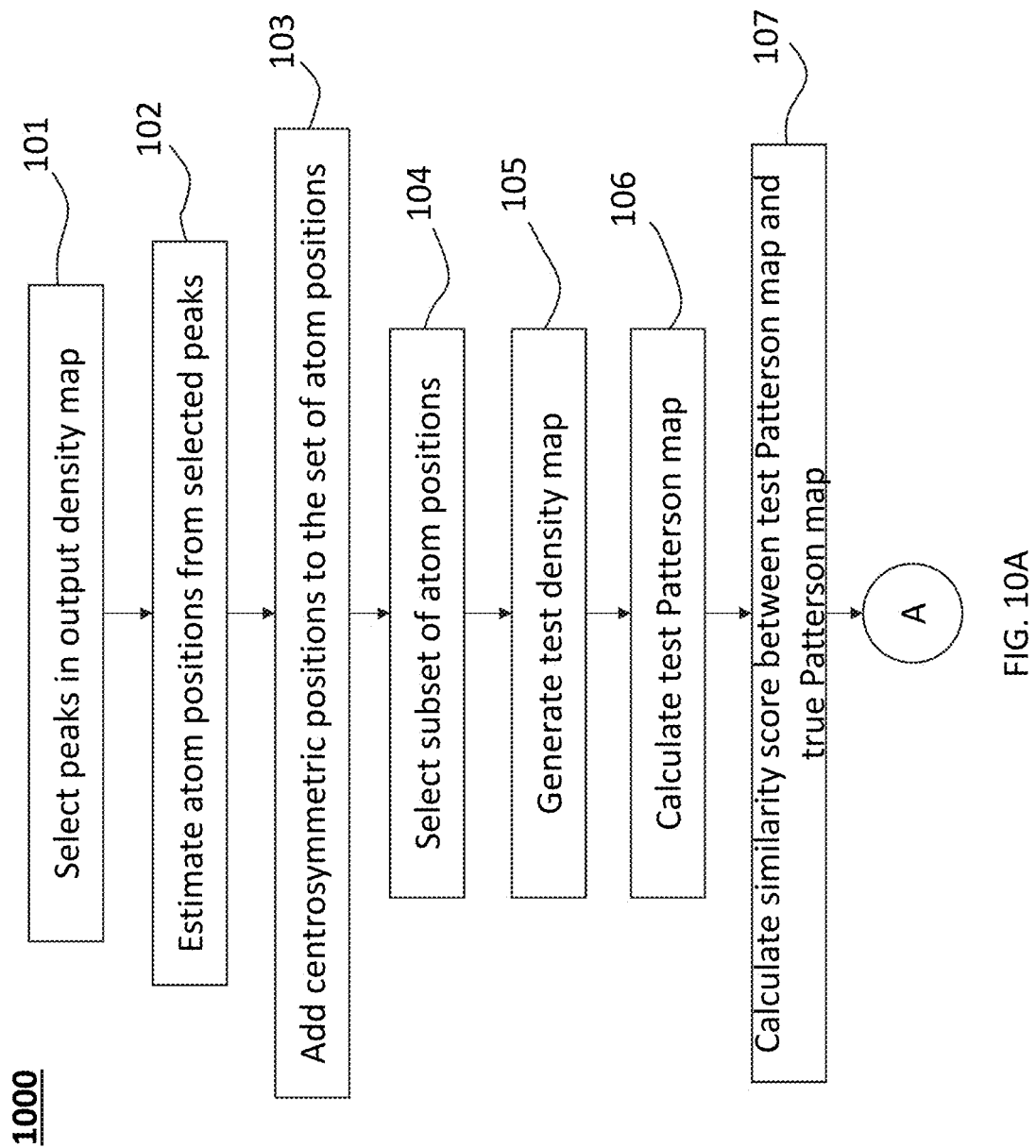
FIGS. 10A and 10B show a conceptual flowchart of a technique according to various aspects of the present disclosure.
Figure 10B:
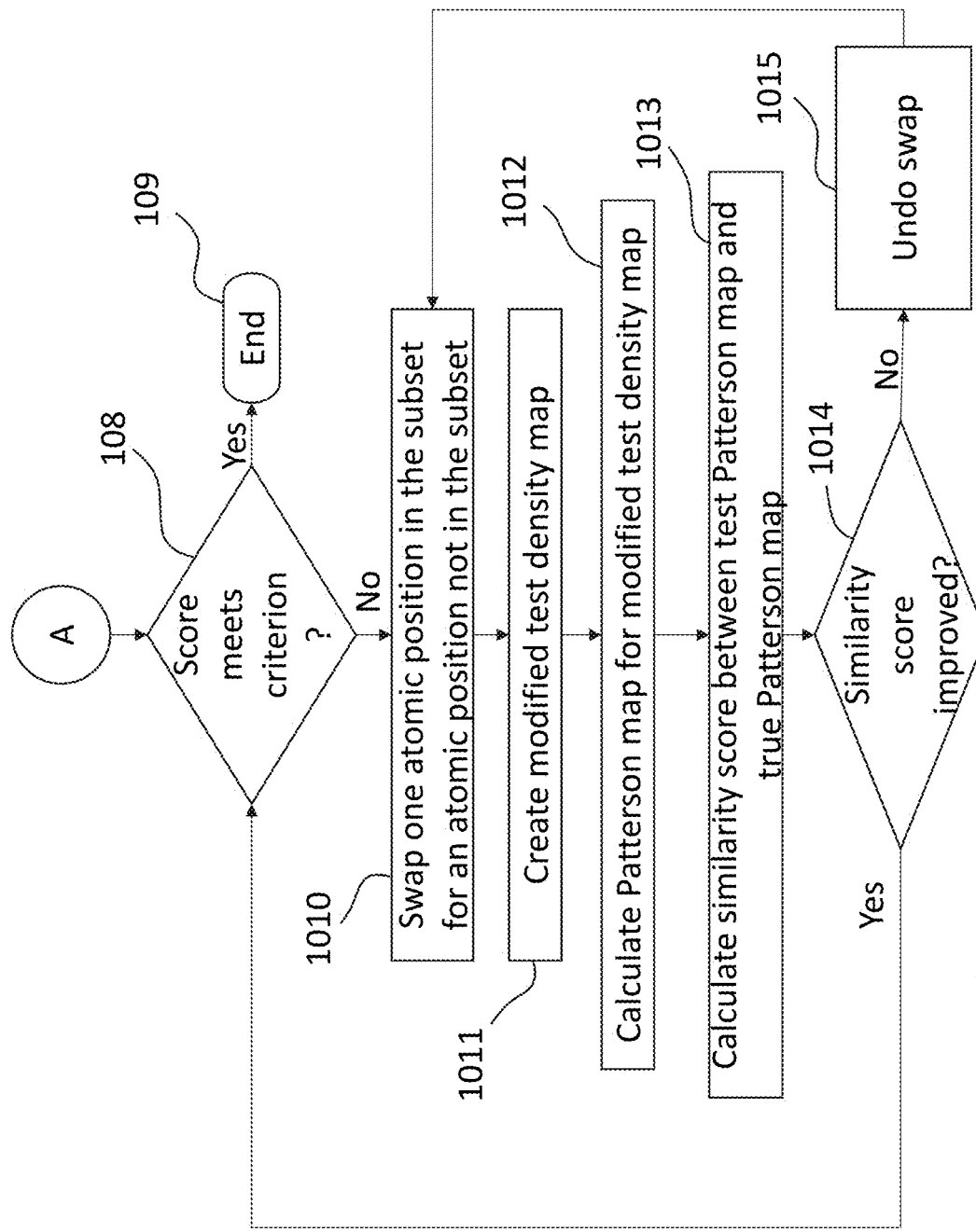

In view of this, one may use a further technique to identify the two sets of atoms corresponding to the two centrosymmetrically-related arrangements. FIGS. 10A and 10B provide a conceptual flow diagram of an example of such a technique, according to various aspects of the present disclosure. The output density map may include peaks in three-dimensional space, and a collection of these peaks may be selected 101. From these peaks, atom positions may be estimated 102, which may be done, for example, by averaging a voxel position corresponding to a peak with positions of its neighbors, weighted by the densities of the respective voxels (see discussion of FIGS. 3 and 4, above). The number of atom positions may then be doubled by adding centrosymmetric positions 103 to the set of atom positions. A subset of the resulting atom positions may then be selected 104. A test density map may then be generated 105 based on the selected subset of atom positions. A test Patterson map may then be generated 106 from the test density map. In order to determine how close the test Patterson map and the true Patterson map (i.e., the Patterson map corresponding to the known atomic structure) are, a similarity score between the test Patterson map and the true Patterson map may be calculated 107; as noted above, this may be done in a number of ways, for example, by using a mean-square error between the test Patterson map and the true Patterson map, which may be done, e.g., on a voxel-by-voxel basis. The similarity score may be tested, e.g., against a predetermined threshold tolerance, to determine if the test Patterson map is sufficiently close to the true Patterson map 108. If such criterion is satisfied, the process may end 109. If not, one atomic position of the selected subset of atomic positions may be swapped 1010 for an atomic position not in the subset. A modified test density map based on this modified subset of atomic positions may then be created 1011. A new test Patterson map may then be calculated 1012 based on the modified subset, and a similarity score between the new test Patterson map and the true Patterson map may be calculated 1013. The resulting similarity score may then be compared with the previous similarity score (i.e., the similarity score between the test Patterson map resulting from the originally selected subset and the new test Patterson map, resulting from the modified subset), and if the similarity score is improved, the modified subset of atomic positions may be kept, and the process may branch back to block 108 to determine if the corresponding test Patterson map is sufficiently close to the true Patterson map. If the similarity score was not improved, the swap of atomic positions that created the modified subset may be undone 1015; this may also include reverting back to the previous test density map. At this point, the process may branch back to block 1010 to create a new modified subset of atomic positions. These latter elements of the process (blocks 1010-1015) may serve to "untangle" the combined centrosymmetric atomic structures.

As an alternative to comparing the similarity score with a predetermined criterion 108, the process may simply be permitted to run for a predetermined sufficiently long time and may accept the resulting split of atoms into two groups, one group being a collection of atoms, the other group being their centrosymmetric counterparts, and each group having a Patterson map that closely matches the target Patterson map, based on a similarity criterion, for example, but not limited to, mean-square error (MSE), absolute difference, etc.

Figure 11:
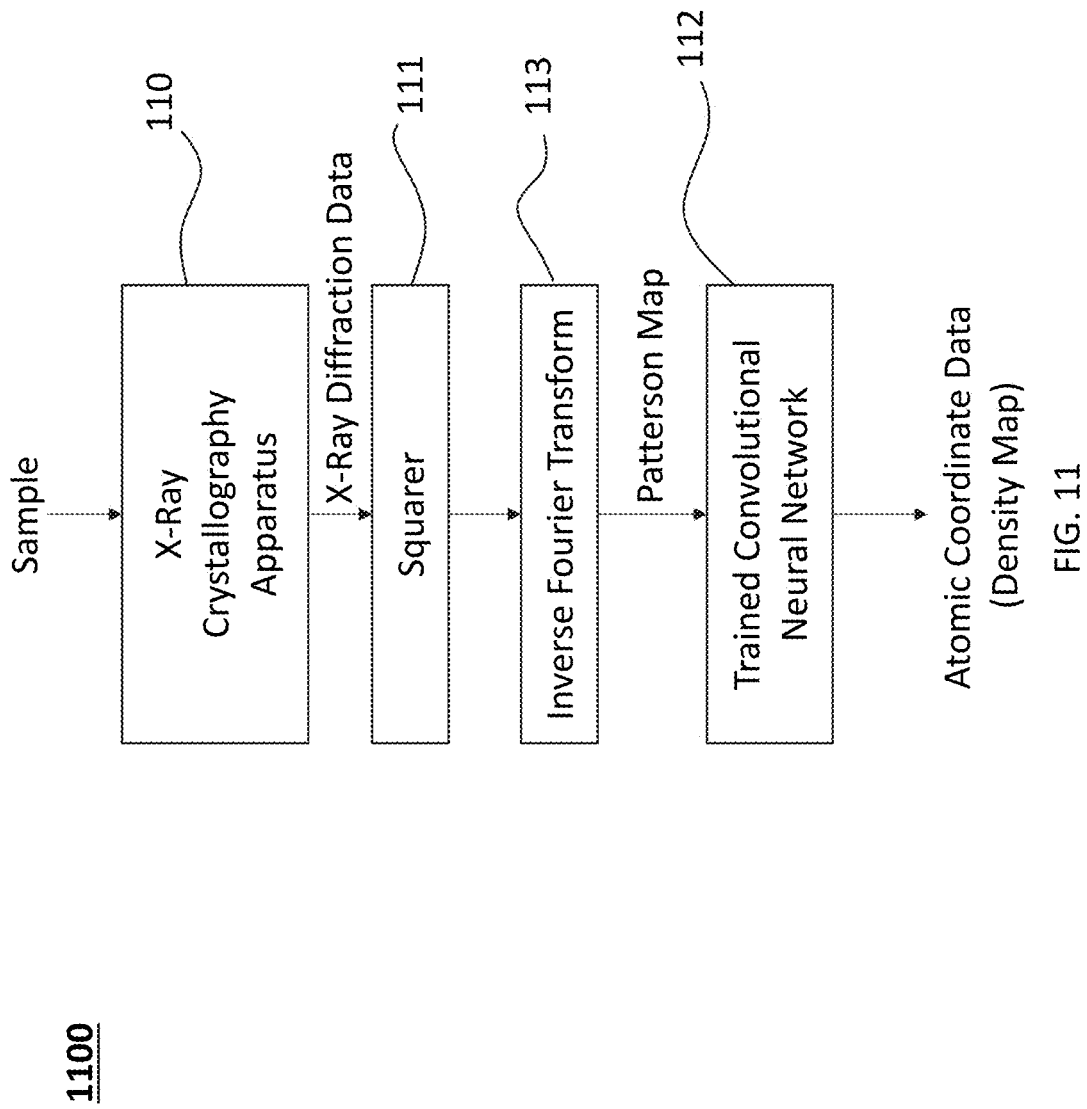
FIG. 11 shows a conceptual block diagram of apparatus according to various aspects of the present disclosure.
Figure 12:
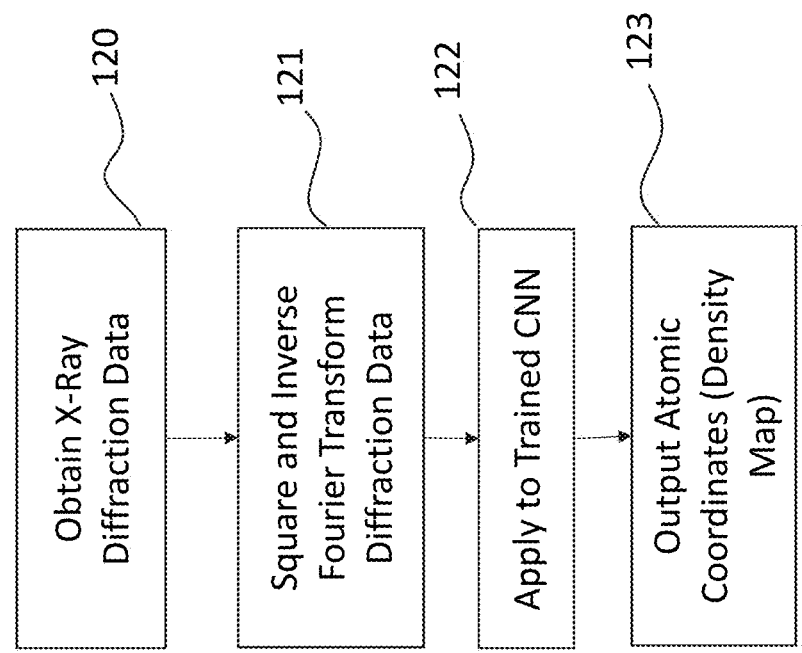
FIG. 12 shows a conceptual flow diagram of a process according to various aspects of the present disclosure.

Once the convolutional neural network has been trained, it may be used in obtaining atomic coordinates/density maps based on x-ray diffraction data derived from unknown samples. FIG. 11 shows a block diagram of an example of an apparatus that may be used in doing so, and FIG. 12 describes an example of a method. An x-ray crystallography apparatus 110 may operate on an unknown sample, and x-ray diffraction data may be obtained 120. The x-ray diffraction data from x-ray crystallography apparatus 110 may be fed into a squarer 111, which may square 121 the x-ray diffraction pattern elements. The results of the squarer 111 may be fed into an inverse Fourier transform 113 (e.g., but not limited to, a dedicated hardware component, a portion of a specialized integrated circuit, a programmed processor, etc.) which may perform an inverse Fourier transform 121 on the squared x-ray diffraction pattern elements, to thus obtain a Patterson map. The Patterson map may then be fed 122 to a trained convolutional neural network 112, e.g., as described above, which may generate atomic coordinate data, which may be in the form of a density map. The atomic coordinates/density map may be output 123.

The system of FIGS. 5 and 6 was used in trials to show the validity of the approach according to aspects of the present disclosure. The neural network of FIGS. 5 and 6 was trained for more than 4,000 epochs (where an "epoch" denotes a training pass over all the data in a training batch), cumulatively, over 26 runs ("runs" were simply sets of epochs using the same training parameters; while the training parameters were adjusted, between runs, this is not necessarily needed, and was only considered for this particular example, to test the above processes). Hyperparameters were adjusted for each run. Typically, the training batch size for a run was 3,000 and the validation batch size was 100 (the validation set is a set of non-training data that may be used to monitor the progress of the training process and is separate from the training set; a member of the validation set, like a member of the training set, may contain a known Patterson map and corresponding known density map). The validation batch was constructed at the start and used for the entire run, while the training batch was constructed at the start, then remade every few epochs (i.e., the validation batch was used after each epoch to test if the network was properly training on the training batch). As a result of this training schedule, the training loss exhibited a zigzag character. For clarity, rather than display losses after each epoch, the high frequency zigzags of the training loss were removed by displaying losses every few epochs, just prior to remaking the training data.

Figure 13:
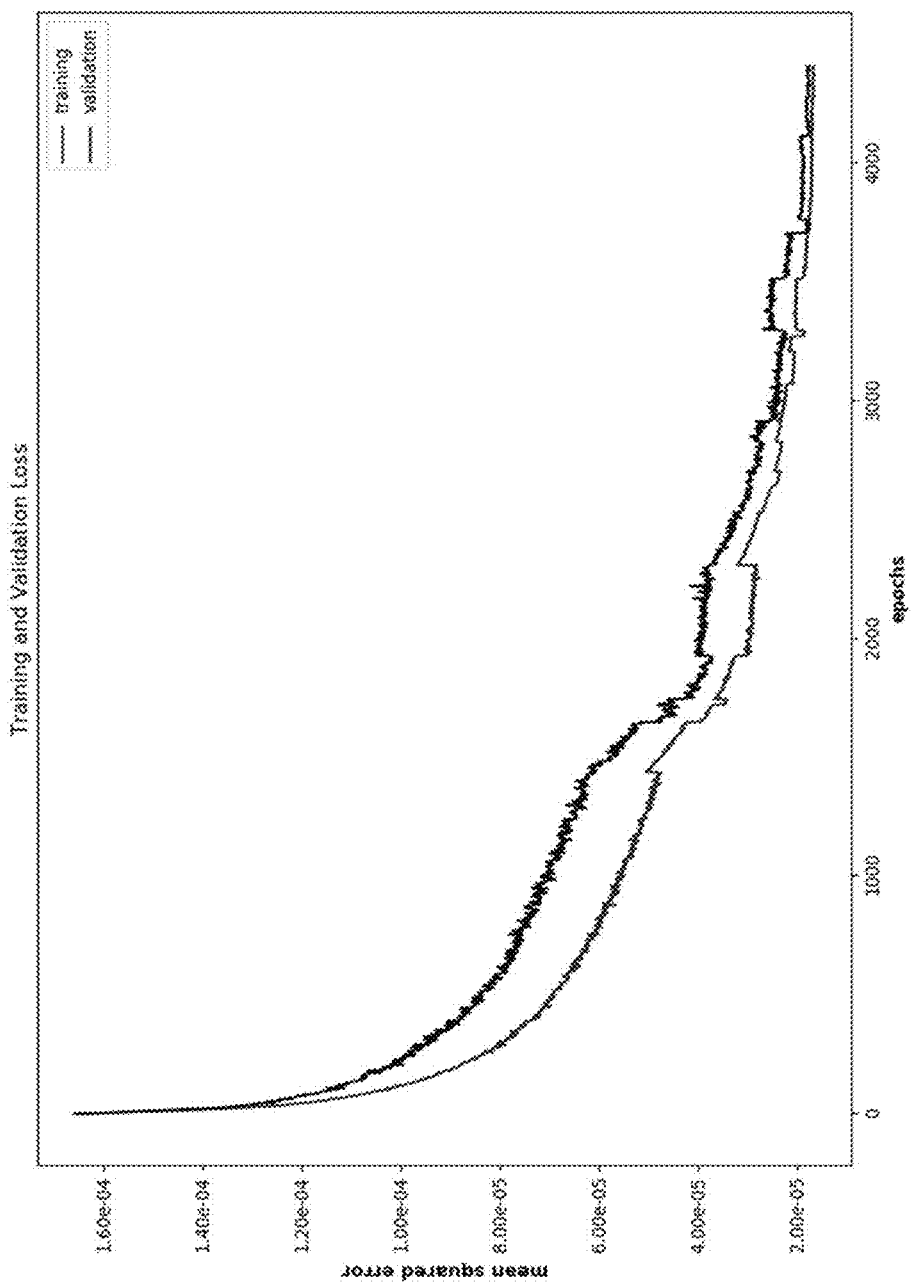
FIG. 13 is a plot of training and validation loss curves during an example demonstration of a convolutional neural network according to aspects of the present disclosure.

FIG. 13 shows the training and validation loss over all training runs (the training loss is represented by the lower curve, and the validation loss is represented by the upper curve). The loss was the mean squared error between the known and inferred density maps. This plot indicates that the neural network generalized to cases not in the training set. First, the validation loss decline was in tandem with the training loss. Secondly, new training cases were made every few epochs, and the starting loss for these cases declined in parallel with the validation loss. In other words, it was evident just by swapping in new training cases that the network was generalizing.

Trials were also run comparing the cases of adding centrosymmetrically-related atoms, versus without the centrosymmetrically-related atoms. Results showed that the network trained and generalized much more effectively when training on both original atoms and centrosymmetrically-related atoms simultaneously.

The trained convolutional neural network was presented with Patterson maps that had not been used during training, but which were based upon known (synthetic) atomic data, in order to test the neural network. FIGS. 14A-14F show results for six different Patterson maps. These results reflect that the predicted atomic structures (right-hand sides) are substantially similar to the original data (left-hand sides).

While the above discussion focuses on the use of Patterson maps as input to the convolutional neural network, for training and for determining atomic structures for unknown data, the present disclosure is not thus limited. The convolutional neural network may, alternatively, operate on training, test, and unknown data corresponding to magnitudes of x-ray diffraction data or squared magnitudes of x-ray diffraction data (without the inverse Fourier transformation to obtain the Patterson map). In these cases, the apparatus of FIG. 11 and the method of FIG. 12 may be modified to accommodate these different inputs. In the case of using magnitudes of the x-ray diffraction data, in FIG. 11, blocks 111 and 113 may be omitted and replaced with a magnitude determining block (not shown), which may take the form of a squarer 111 followed by a square-root block (not shown); correspondingly, in FIG. 12, block 121 may be omitted and replaced with a block of "determining magnitude," which, again, may be performed by squaring and performing a square-root. In the case of squared magnitudes, in FIG. 11, block 113 may be omitted, and in FIG. 12, the inverse Fourier transform may be omitted from block 121. Note that each of these operations, in each case, may be applied to each component of the x-ray diffraction data.

Training of the convolutional neural network in these cases may proceed as shown in FIG. 2. In these cases, however, the generation of the input/output pairs of the training data may be modified in accordance with the type of input data that the convolutional neural network is intended to accept. That is, one may begin with a known output atomic structure/electron density map, which may include a known atomic structure combined with its centrosymmetrically-related atomic structure, but instead of applying the Patterson function, different processes may be used to generate the corresponding input. For either magnitude or magnitude-squared x-ray diffraction data, one may first apply Fourier transformation to the known electron density map (or equivalently, to its centrosymmetric counterpart). For magnitude x-ray diffraction input data, one may then obtain the magnitudes of the results of the Fourier transformation to form magnitude synthetic x-ray diffraction data. For squared-magnitude x-ray diffraction input data, one may obtain squared magnitudes of the results of the Fourier transformation to form squared-magnitude synthetic x-ray diffraction data. As an aside, one could also obtain Patterson map training data by beginning with the squared-magnitude Fourier transform data and applying inverse Fourier transformation to the squared-magnitude Fourier transform data.

It is noted that the operations of FIGS. 10A-10B may equivalently use magnitude x-ray diffraction data or magnitude-squared x-ray diffraction data in place of Patterson maps.

Figure 15:
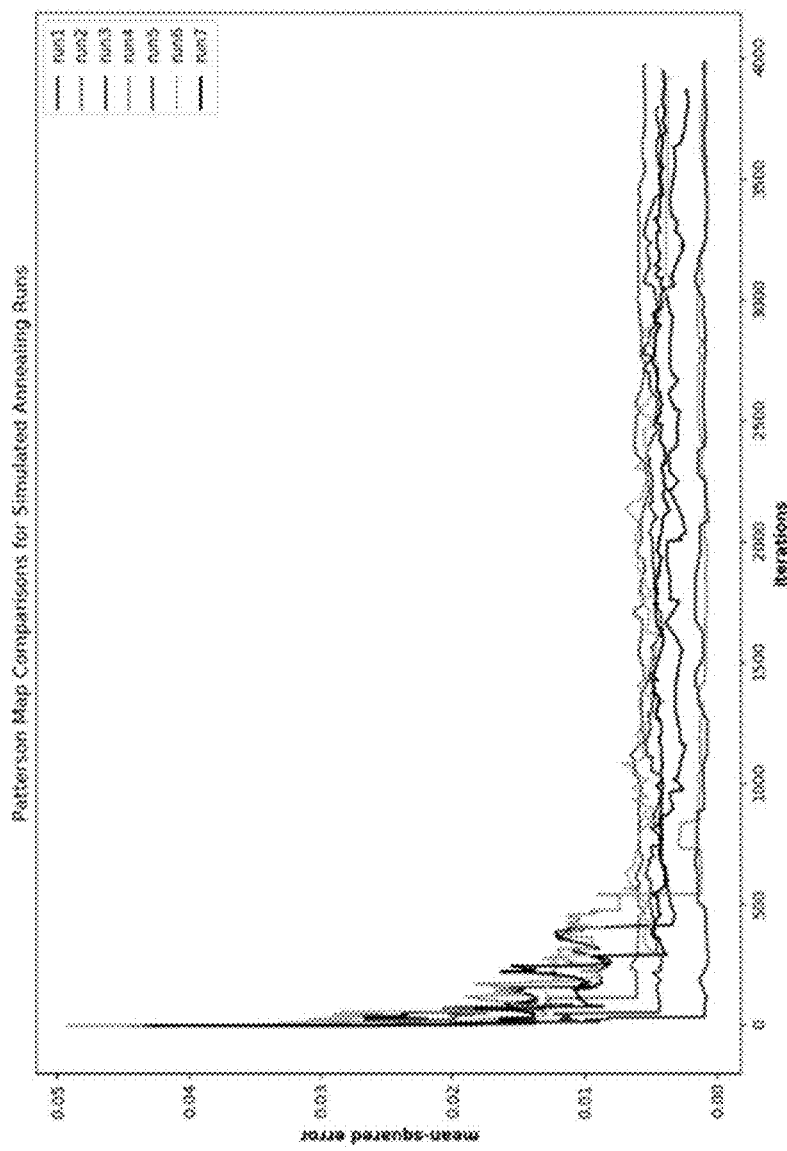
FIG. 15 shows mean-squared error plots for various trials of a demonstration trained convolutional neural network according to various aspects of the present disclosure.

The convolutional neural network, as discussed above, may be simultaneously trained on an atomic structure, along with its centrosymmetrically-placed atomic structure. As also discussed above, the procedure according to FIGS. 10A-10B may be used to separate the two atomic structures (original and centrosymmetric). In some example demonstrations, this process was applied to neural network outputs resulting from non-training data. FIG. 15 shows mean-squared error plots, between Patterson maps computed from the neural network outputs and known Patterson maps, for seven test cases. As shown, mean-square error may improve (decrease) as the process proceeds and settles on a set of atomic positions and its centrosymmetric counterpart (for determining accuracy, the closer of the structure and its centrosymmetric counterpart was compared to the known test case output).

Figure 16:
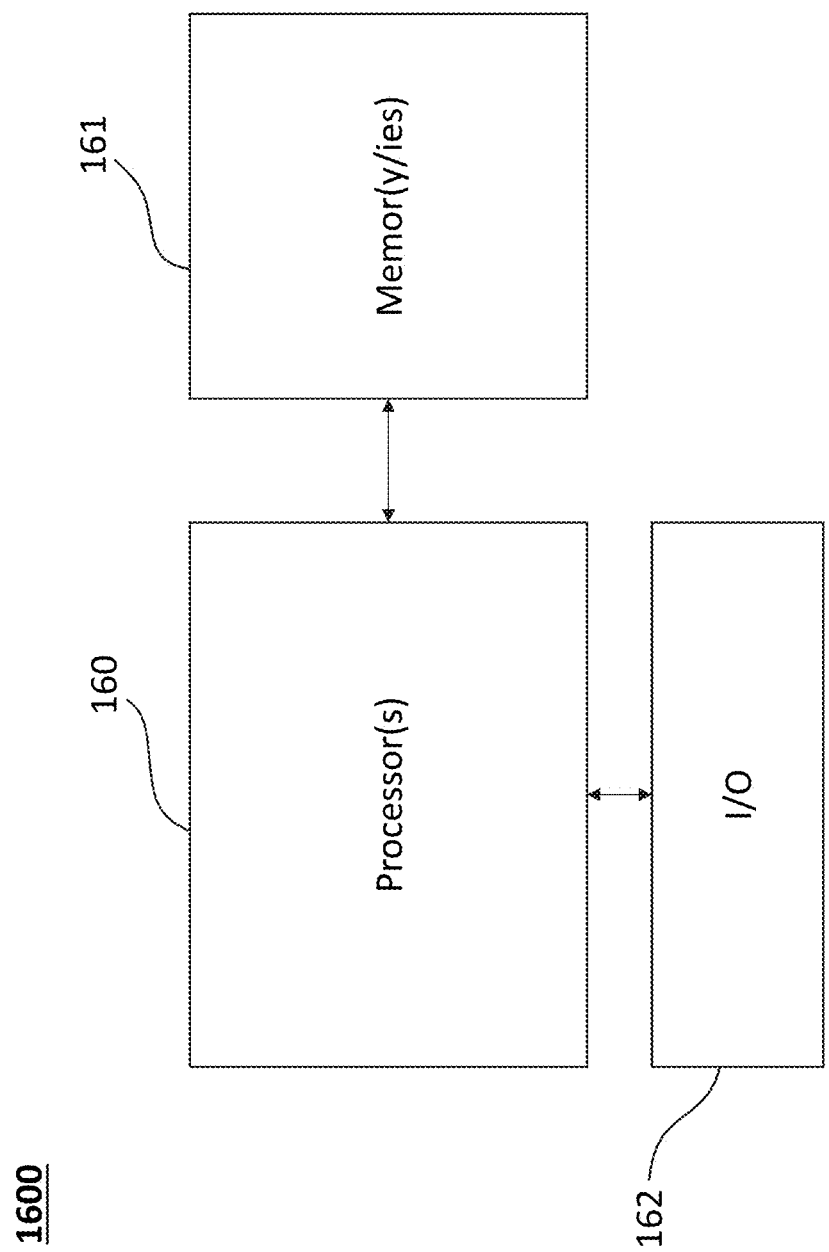
FIG. 16 shows a conceptual block diagram of a system that may be used to implement at least a portion of a system according to various aspects of the present disclosure.

The various techniques presented according to various aspects of the present disclosure may be implemented in various ways, including in hardware, software, firmware, or combinations thereof. FIG. 16 shows an example of a system in which at least portions of various aspects of the present disclosure may be implemented. Such a system may include one or more processors 160, which may include, but which are not limited to, central processing units (CPUs), graphical processing units (GPUs), computer systems, etc. The one or more processors 160 may be communicatively coupled to one or more memory units 161, which may store system software and/or software/instructions that may cause the system to implement operations according to various techniques discussed above. Memory unit(s) 161 may include read-only memory (ROM), random-access memory (RAM), flash memory, programmable memory, magnetic memory (e.g., disk memory, tape memory, etc.), optical memory (e.g., compact disk (CD), digital versatile disk (DVD), etc.), etc. The one or more processor(s) 160 may also be communicatively coupled to input/output (I/O) devices/interfaces 162, which may permit the system, or the portion implemented by the system of FIG. 16, to communicate with other portions of an overall system, other systems, a system operator, etc. I/O 162 may allow data to be provided to processor(s) 160 and/or to be output from processor(s) 160.

Programmable or customized devices, such as, but not limited to, programmable logic arrays (PLAs), application-specific integrated circuits (ASICs), systems-on-a-chip (SOCs), etc., may also be used to implement at least portions of a system according to various aspects of the present disclosure.

Various aspects of the disclosure have now been discussed in detail; however, the invention should not be understood as being limited to these aspects. It should also be appreciated that various modifications, adaptations, and alternative embodiments thereof may be made within the scope and spirit of the present invention.

What is claimed is:

1. A method of training a convolutional neural network to obtain an atomic structure corresponding to an input data derived from x-ray diffraction data, the method including:
   from a set of known atomic positions, generating a first three-dimensional electron density map;
   calculating neural network input training data based on the three-dimensional electron density map;

determining corresponding centrosymmetric positions from the set of known atomic positions and generating a second three-dimensional electron density map from the corresponding centrosymmetric positions;

adding the first and second three-dimensional electron density maps to obtain a composite electron density map;

applying the neural network input training data at an input side of the convolutional neural network;

comparing resulting output of the convolutional neural network to the composite electron density map to generate errors;

back-propagating the errors through the convolutional neural network; and performing said generating a first three-dimensional electron density map; said calculating neural network input training data; said determining corresponding centrosymmetric positions and generating a second three-dimensional electron density map; adding the first and second three-dimensional density maps; said applying; said comparing; and said back-propagating for multiple sets of known atomic positions.

2. The method according to claim 1, wherein the neural network input training data is of a type selected from the group consisting of (a) a Patterson map, (b) squared-magnitude synthetic x-ray diffraction data, or (c) magnitude synthetic x-ray diffraction data.

3. A method of obtaining atomic structure of a sample based on x-ray diffraction data obtained from the sample, the method including:

performing the method of claim 1 to obtain a trained convolutional neural network;

deriving neural network input data corresponding to the x-ray diffraction data obtained from the sample;

feeding the neural network input data to the trained convolutional neural network; and obtaining an output electron density map corresponding to the sample.

4. The method according to claim 3, wherein said deriving comprises: (a) squaring the x-ray diffraction data and performing an inverse Fourier transform on results of the squaring to obtain a Patterson map corresponding to the sample, (b) squaring the x-ray diffraction data obtained from the sample to obtain squared-magnitude x-ray diffraction data corresponding to the sample, or (c) squaring the x-ray diffraction data obtained from the sample and applying a square-root function to obtain magnitude x-ray diffraction data corresponding to the sample.

5. The method according to claim 3, further including:
locating peaks in the output electron density map; and
determining atomic positions based on the peaks by taking weighted positional averages of the peaks and their neighboring voxels.

6. The method according to claim 5, further including:
separating the atomic positions into two sets of atoms, a first set of atoms and a second set of atoms corresponding to a centrosymmetric inversion of the first set of atoms, using the neural network input data as a guide, as follows:

randomly dividing the atomic positions into two sets of atoms;

calculating a first test data set for one of these two sets of atoms and comparing it to the neural network input data to obtain a first similarity score, wherein said calculating a first test data set is performed according to an operation used in said deriving the neural network input data;

adjusting the compositions of the two sets of atoms by swapping an atom in one set with an atom in the other set, computing a second test data set, using the operation used in said deriving the neural network input data, for one of the two sets of atoms, and obtaining a second similarity score by comparing the second test data set to the neural network input data;

keeping the swap if the second similarity score that indicates that the second test data set is more similar to the neural network input data than the first test data set, and adopting the second test data set as the first test data set and the second similarity score as the first similarity score;

reverting the swap if the second similarity score indicates that the second test data set is less similar to the neural network input data than the first test data set;

continuing swaps until the first similarity score meets a predetermined criterion, or continued swaps result in an absolute difference between the first similarity score and the second similarity score that is less than a predetermined amount;

outputting the resulting two sets of atoms as an output set of atoms and an output centrosymmetric inversion of the output set of atoms.

7. A non-transitory computer-readable medium containing executable instructions recorded thereon that are designed to implement the method according to claim 3.

8. A non-transitory computer-readable medium containing executable instructions recorded thereon that are designed to implement the method according to claim 1.

9. An apparatus including:
at least one processor; and
one or more memory devices communicatively coupled to the at least one processor,
wherein the one or more memory devices contain executable instructions recorded thereon that are designed to implement the method according to claim 1.

10. An apparatus including:
at least one processor; and
one or more memory devices communicatively coupled to the at least one processor,
wherein the one or more memory devices contain executable instructions recorded thereon that are designed to implement the method according to claim 3.

11. A method of obtaining atomic structure of a sample based on x-ray diffraction data obtained from the sample, the method including:

squaring the x-ray diffraction data to obtain squared-magnitude x-ray diffraction data;
and
processing the squared-magnitude x-ray diffraction data or data derived from the squared-magnitude x-ray diffraction data to obtain an output atomic structure corresponding to the sample, wherein said processing comprises feeding the squared-magnitude x-ray diffraction data or data derived from the squared-magnitude x-ray diffraction data to a convolutional neural network trained to output an atomic structure based on input corresponding to the squared-magnitude x-ray diffraction data or data derived from the squared-magnitude x-ray diffraction data.

12. The method according to claim 11, wherein the atomic structure output from the convolutional neural network comprises a first atomic structure and a second atomic structure that is centrosymmetrically related to the first atomic structure.

13. The method according to claim 11, wherein the atomic structure comprises an electron density map.

14. The method according to claim 11, wherein the squared-magnitude x-ray diffraction data or data derived from the squared-magnitude x-ray diffraction data is selected from the set consisting of: the squared-magnitude x-ray diffraction data; a magnitude x-ray diffraction data obtained from the square-magnitude x-ray diffraction data by applying a square-root function; and a Patterson map obtained from the squared-magnitude x-ray diffraction data by applying inverse Fourier transformation.

15. A non-transitory computer-readable medium containing executable instructions recorded thereon that are designed to implement the method according to claim 11.

16. An apparatus configured to obtain atomic structure of a sample based on x-ray diffraction data obtained from the sample, the apparatus comprising:
a squarer arranged to accept the x-ray diffraction data obtained from the sample and to output squared-magnitude x-ray diffraction data; and
a processing device configured to accept as input the squared-magnitude x-ray diffraction data or data derived from the squared-magnitude x-ray diffraction data and to output an atomic structure based on the input squared-magnitude x-ray diffraction data or data derived from the squared-magnitude x-ray diffraction data,
wherein the processing device comprises a convolutional neural network trained to accept as input squared-magnitude x-ray diffraction data or data derived from the squared-magnitude x-ray diffraction data and to output an atomic structure based on the squared-magnitude x-ray diffraction data or data derived from the squared-magnitude x-ray diffraction data.

17. The apparatus according to claim 16, wherein the atomic structure output from the convolutional neural network comprises a first atomic structure and a second atomic structure that is centrosymmetrically related to the first atomic structure.

18. The apparatus according to claim 16, wherein the atomic structure comprises an electron density map.

19. The apparatus according to claim 16, wherein the squared-magnitude x-ray diffraction data or data derived from the squared-magnitude x-ray diffraction data is selected from the set consisting of: the squared-magnitude x-ray diffraction data; a magnitude x-ray diffraction data obtained from the squared-magnitude x-ray diffraction data by applying a square-root function; and a Patterson map obtained from the squared-magnitude x-ray diffraction data by applying inverse Fourier transformation;
wherein, for the case of magnitude x-ray diffraction data, the apparatus further comprises a square-root device arranged to accept as input the squared-magnitude x-ray diffraction data and to output the magnitude x-ray diffraction data; and
wherein, for the case of the Patterson map, the apparatus further comprises an inverse Fourier transformer arranged to accept as input the squared-magnitude x-ray diffraction data and to output the Patterson map.

* * * * *